W. W. STEVENSON.
FLUID FLOW METER.
APPLICATION FILED JULY 11, 1914.
1,229,805.
Patented June 12, 1917.
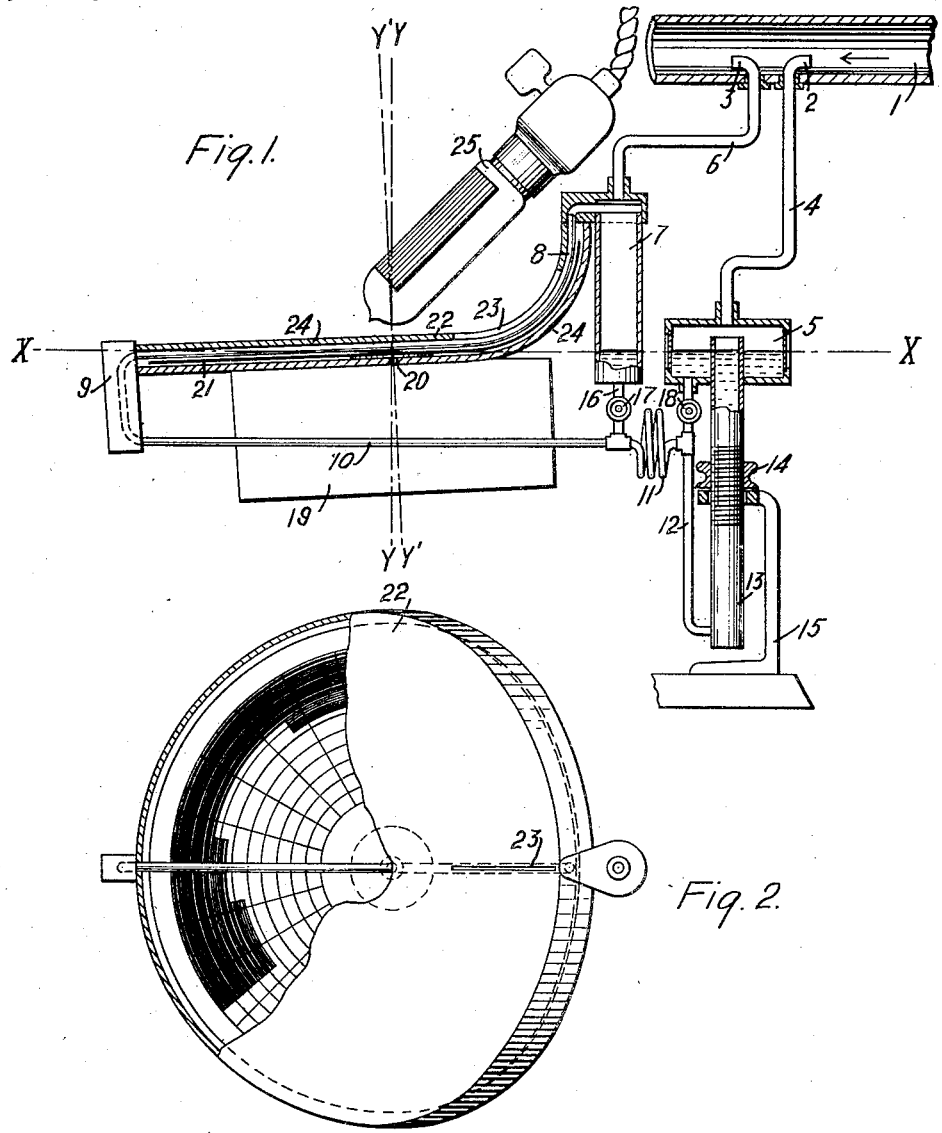
WITNESSES:
Fred A. Lind
JH Procter
INVENTOR
Wilbur Wesley Stevenson
BY
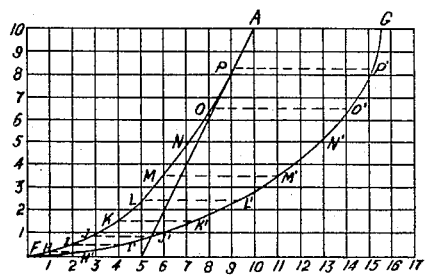
ATTORNEY

UNITED STATES PATENT OFFICE.

WILBUR W. STEVENSON, OF WILKINSBURG, PENNSYLVANIA, ASSIGNOR TO WESTINGHOUSE ELECTRIC AND MANUFACTURING COMPANY, A CORPORATION OF PENNSYLVANIA.

FLUID-FLOW METER.

1,229,805.  Specification of Letters Patent.  Patented June 12, 1917.

Application filed July 11, 1914. Serial No. 850,297.

*To all whom it may concern:*

Be it known that I, WILBUR WESLEY STEVENSON, a citizen of the United States, and a resident of Wilkinsburg, in the county of Allegheny and State of Pennsylvania, have invented a new and useful Improvement in Fluid-Flow Meters, of which the following is a specification.

My invention relates to fluid-flow meters and particularly to recording fluid-flow meters.

One object of my invention is to provide a fluid-flow meter of the above-indicated type which is inexpensive, and which has simple and accurate adjustments.

Another object of my invention is to provide a fluid-flow meter which produces a record upon a sensitized disk having uniform scale divisions.

Heretofore, recording fluid-flow meters have been provided with meter-actuated pens to record the measured values. This required a considerable amount of energy to operate and also very complicated adjustments.

I provide an accurate and easily adjusted fluid-flow meter which does not require a movable marking device.

Figure 1 of the accompanying drawing is a side view, partially in elevation and partially in section, of a fluid-flow meter embodying my invention; Fig. 2 is a fragmentary top view, partially in plan and partially in section, of the fluid-flow meter shown in Fig. 1; and Fig. 3 is a curve diagram showing a graphic method of determining the correct form of the U tube employed in my invention.

A pipe 1 in which flows a fluid, the volume of which is to be determined, has fitted therein two oppositely disposed nozzles 2 and 3 forming a so-called Pitot tube. The nozzle 2 is connected, by a pipe 4, to a receptacle or reservoir 5, and the nozzle 3 is connected, by a pipe 6, to a receptacle or reservoir 7. A tube 8 of glass or other transparent material is connected to the receptacle 7 and to a header 9. A pipe 10 is connected, at one end, through the header 9, to the tube 8, and, at its other end, to a flexible tube 11. The flexible tube 11 is connected to a pipe or tube 12 which is connected also to the receptacle 5 at one end and to a tube 13 at its other end. The tube 13 is inserted in the receptacle 5 and has a screw-thread on its outer surface to receive an adjusting nut 14 which is supported by a bracket 15, substantially as shown in the drawing. The flexible tube 11 is connected also to the receptacle 7 through a pipe or tube 16 in which is located a valve 17. A valve 18 is located in the pipe 12, for reasons hereinafter set forth.

A clock mechanism (not shown), which is contained in a box 19, drives a shaft 20 to which is attached a disk 21 of sensitized paper. The sensitized disk 21 is inclosed in a casing 22 having a slit 23 therein. The transparent tube 8 is disposed within the casing 22 and adjacent to the slit 23, for reasons hereinafter set forth. The disk 21 is rotated between metal plates 24 of such shape, that, as it passes the slit 23, it will form a curved surface of a shape substantially the same as the curvature of the tube 8. An incandescent lamp 25 is placed near the slit 23. The lamp is preferably provided with a single wire filament and a reflecting surface of such form as to focus its light on the slit 23.

The pipes or tubes 4, 12, 11, 10, 8 and 6, as normally connected, form a U tube. The receptacle 5 and the pipes are filled to a level indicated by the line X—X with some opaque fluid, such as mercury. The valve 17 is normally closed and the valve 18 is normally open.

Assuming the fluid to flow in the pipe 1 in the direction indicated by the arrow, a difference in pressure between the nozzles 2 and 3 is produced which is substantially proportional to the square of the quantity or volume of the fluid flowing. When no fluid flows, there will be no difference in pressure between the nozzles 2 and 3, and the mercury will stand as indicated by the line X—X in both legs of the tube. However, if fluid flows through the pipe 1, the level of the mercury will rise in the tube 8 to exclude the light of the lamp 25 from a portion of the slit 23 and thus produce a record on the disk 21 of the fluid flowing. Since the disk 21 rotates at a uniform speed, there will be a continuous record produced of the flow of the fluid during any predetermined time.

The receptacle 7 is provided as an overflow receptacle to prevent the mercury from being forced into the pipe 1 in case the difference in pressure between the nozzles 2 and 3 become too great. With no fluid flowing, the device may be adjusted by turning the nut 14 to raise or lower the tube 13 and the reservoir 5 to bring the mercury to its zero position indicated by the line X—X.

If it is necessary to change the calibration of the device for relatively greater volumes of fluid, the valve 18 may be closed and the valve 17 opened, thereby forming a U tube with a second U tube in parallel relation thereto. With this arrangement, relatively higher pressures may be exerted with the same rise of mercury in the tube 8. Other adjustments for various pressure differences may be made by substituting various opaque fluids for the mercury or by rotating the tube 8 around a horizontal axis X—X. Corrections for pressure and temperature of the fluid traversing the pipe 1 may also be made by rotating the pipe 8 about a horizontal axis X—X.

Since it is highly desirable that the divisions of the scale on the disk 21 be equal in order that the record produced may be readily planimetered, and, since the height of the mercury in the pipe 8 is not directly proportional to the quantity or volume of fluid traversing the pipe 1, the disk 21 must be curved by the plates 24 to produce a record, the divisions of which are proportional to the quantity or volume of the fluid flowing.

The vertical height of the mercury in the tube 8, under all conditions, is expressed by the equation $X^2 = KW$ where X is the height of the mercury, K is a constant, and W is the volume of the fluid flowing, and, since this equation is the equation of a parabola, it may be shown that the disk 21 must be of such shape that, if the differential pressure will sustain a volume of mercury one inch high, the chart, and consequently the tube, must be two inches long.

Referring to Fig. 3, the curve FA is a parabola of the form $X^2 = KW$. The horizontal distance between F and A is divided into a number of equal parts, since this distance refers mathematically to the fluid to be measured. The vertical lines drawn through these divisions will cut the parabolic curve at the points H, I, J, K, L, M, N, O and P. From these points, horizontal dotted lines are drawn to the right. These lines will divide the length of the curve sought into a number of equal parts. Each part will have a length $\frac{2Y'}{N}$ where N is the number of parts and Y' is the vertical height of the point A. Beginning at the point F, lay off $\frac{2Y'}{N} = FH'$ and $\frac{2Y'}{N} = H'I'$ and similarly for each distance to determine the points H', I', J', K', L', M', N', O', P'. A curve drawn through these points will determine the shape of the curved plates 24 and the curvature of the tube 8 to produce a record having equal scale divisions.

While I have shown my invention in its preferred form, it is not so limited, but is capable of various modifications, within the scope of the appended claims.

I claim as my invention:

1. A fluid-flow meter comprising a U-tube having a parabolic portion, a fluid within said U-tube for indicating, by a difference in level of the fluid in the parabolic portion, the differential pressure caused by the flow of a fluid in a conduit, and a sensitized rotatable disk adapted to record the variations in the level of the fluid in the parabolic portion of the U-tube.

2. A fluid-flow meter comprising a U tube operatively connected to a conduit and having a parabolic portion, a fluid within said U tube for indicating, by a difference in level in the parabolic portion, the flow in said conduit, and a sensitized surface adapted to record the variations in level of the fluid in said U tube.

3. In a measuring instrument, the combination with a U-tube operatively connected to a conduit and having a substantially curved portion, and a fluid in the U-tube, of a sensitized rotatable member, and means for exposing the said sensitized member through the curved portion of the said U-tube to produce a record of the difference in level of the fluid in the curved portion of the U-tube.

4. In a measuring instrument, the combination with a U tube operatively connected to a pipe and having a substantially transparent curved portion, of a sensitized rotatable screen, and means for exposing said sensitized screen through the curved portion of the said U tube to produce a record of the height of the fluid in said U tube.

5. In a measuring instrument, the combination with a U-tube operatively connected to a conduit and having a substantially curved portion, and a fluid in the U-tube, of a sensitized rotatable member having uniform scale divisions, and means for exposing the said sensitized member through the curved portion of the said U-tube to produce a record of the difference in level of the fluid in the U-tube.

6. In a measuring instrument, the combination with a U tube having a substantially transparent parabolic portion, of a rotatable member having a sensitized surface, an opaque fluid in said U tube, and means for excluding light from all parts of the sensitized surface except that part which is adjacent to the transparent parabolic portion of the U tube.

7. In an instrument for determining the flow of a fluid, the combination with a U tube having a parabolic portion that is substantially transparent, of a sensitized rotatable sheet placed in close proximity to the said parabolic transparent portion, means for rotating said sheet at a predetermined rate of speed, and means for exposing said sheet in accordance with the quantity of fluid flowing.

8. A fluid-flow meter comprising a U tube having a parabolic portion for recording the flow of the fluid, and means for rotating the said U tube to correct for temperature and pressure changes of the said fluid.

9. A fluid-flow meter comprising a U tube having a parabolic portion for indicating the differential pressure caused by the flow of a fluid in a conduit, a sensitized rotatable disk and means for causing the portion of the disk that is adjacent to the parabolic portion of the tube to be substantially parallel thereto.

10. A fluid-flow meter comprising a U tube having a parabolic portion for indicating the differential pressure caused by the flow of a fluid in a conduit, a sensitized rotatable disk and means for causing the portion of the disk that is adjacent to the parabolic portion of the tube to be substantially parallel thereto in order to obtain a record having uniform divisions.

11. A fluid-flow meter comprising a U tube having a parabolic portion for indicating the differential pressure caused by the flow of a fluid in a conduit, a sensitized disk having uniform scale divisions and means for causing the portion of the disk that is adjacent to the parabolic portion of the tube to be substantially parallel thereto when the disk is rotated.

12. A fluid-flow meter comprising a U tube operatively connected to a conduit and having a substantially parabolic portion, a fluid within the U tube for indicating, by a difference in level, the flow in the conduit, a sensitized disk, means for rotating the disk and means for maintaining the portion of the disk that is adjacent the parabolic portion of the tube substantially parallel thereto.

13. A fluid-flow meter comprising a U tube operatively connected to a conduit and having a substantially parabolic portion a fluid within the U tube for indicating, by a difference in level, the flow in the conduit, a sensitized disk and means for rotating the disk substantially parallel to the parabolic portion of the U tube.

14. A fluid-flow meter comprising a U tube operatively connected to a conduit and having a substantially parabolic portion, a fluid within the U tube for indicating, by a difference in level, the flow in the conduit, a sensitized disk and means for causing portions of the disk to assume positions substantially parallel to the parabolic portion of the tube when rotating adjacent thereto.

In testimony whereof, I have hereunto subscribed my name this 30th day of June, 1914.

WILBUR W. STEVENSON.

Witnesses:
 VERA H. BATHGATE,
 B. B. HINES.